(12) United States Patent
McDearmon

(10) Patent No.: US 7,240,570 B2
(45) Date of Patent: Jul. 10, 2007

(54) LOAD-SENSING BEARING

(75) Inventor: Graham McDearmon, North Canton, OH (US)

(73) Assignee: The Timken Company, Canton, OH (US)

(*) Notice: Subject to any disclaimer, the term of this patent is extended or adjusted under 35 U.S.C. 154(b) by 183 days.

(21) Appl. No.: 11/219,933

(22) Filed: Sep. 6, 2005

(65) Prior Publication Data

US 2007/0051187 A1 Mar. 8, 2007

(51) Int. Cl.
 *G01L 3/14* (2006.01)
(52) U.S. Cl. .............................. 73/862.322
(58) Field of Classification Search ........... 73/862.322, 73/862.321, 7, 862.381, 862.59, 862.29; 29/898.09
See application file for complete search history.

(56) References Cited

U.S. PATENT DOCUMENTS

| 4,748,844 | A | 6/1988 | Yoshikawa et al. |
| 4,821,582 | A | 4/1989 | Meyer et al. |
| 5,140,849 | A | 8/1992 | Fujita et al. |
| 5,142,177 | A | 8/1992 | Higuchi et al. |
| 6,658,943 | B2* | 12/2003 | McDearmon ............ 73/795 |
| 6,823,972 | B2* | 11/2004 | Gmirya .................. 192/41 S |

FOREIGN PATENT DOCUMENTS

| GB | 1012210 | 12/1965 |
| GB | 2190201 | 11/1987 |
| WO | 2006124485 | 11/2002 |

* cited by examiner

*Primary Examiner*—Jewel Thompson
(74) *Attorney, Agent, or Firm*—Polster, Lieder, Woodruff & Lucchesi, L.C.

(57) ABSTRACT

A load sensing bearing assembly comprises a bearing outer race secured to an application structure by a flange assembly incorporating a plurality of anisotropic spring regions which enable a limited range of displacement and/or rotation of the bearing outer race relative to the application structure in response to applied forces or moments. A set of sensor modules disposed through the bearing outer race and flange assembly acquire measurements from which the radial forces, thrust forces, and tilting moments exerted on the bearing outer race can be determined.

36 Claims, 15 Drawing Sheets

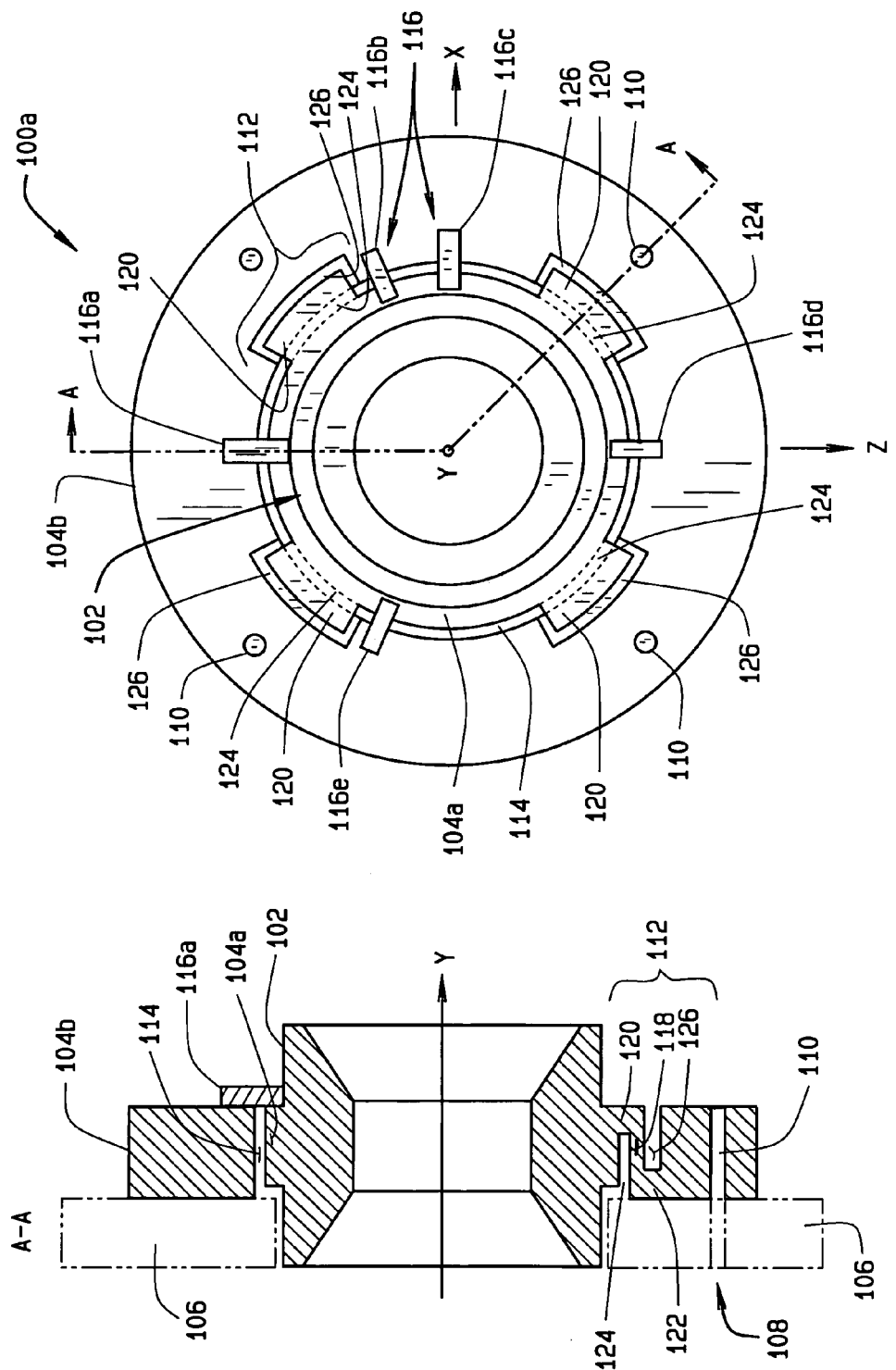

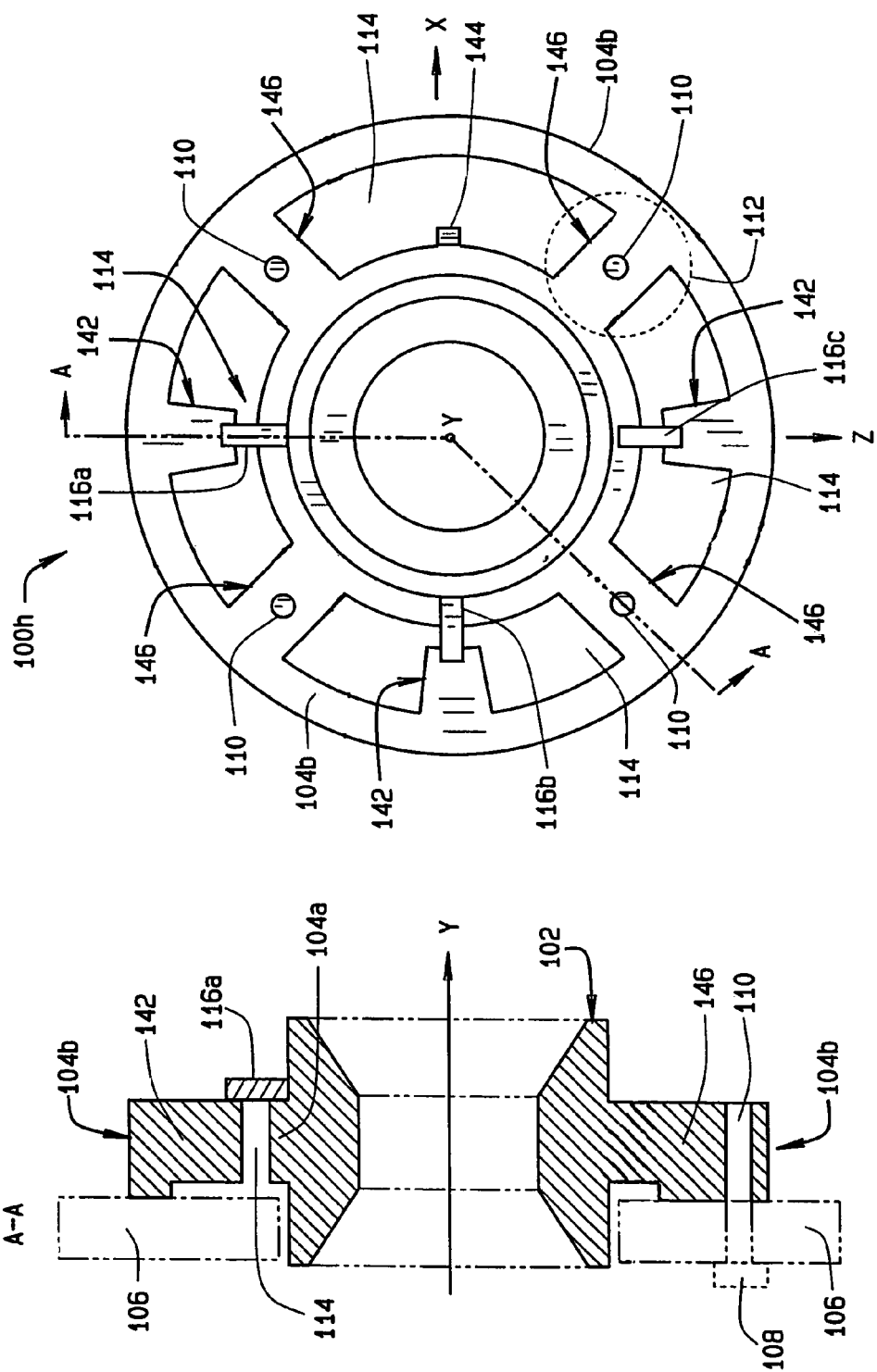

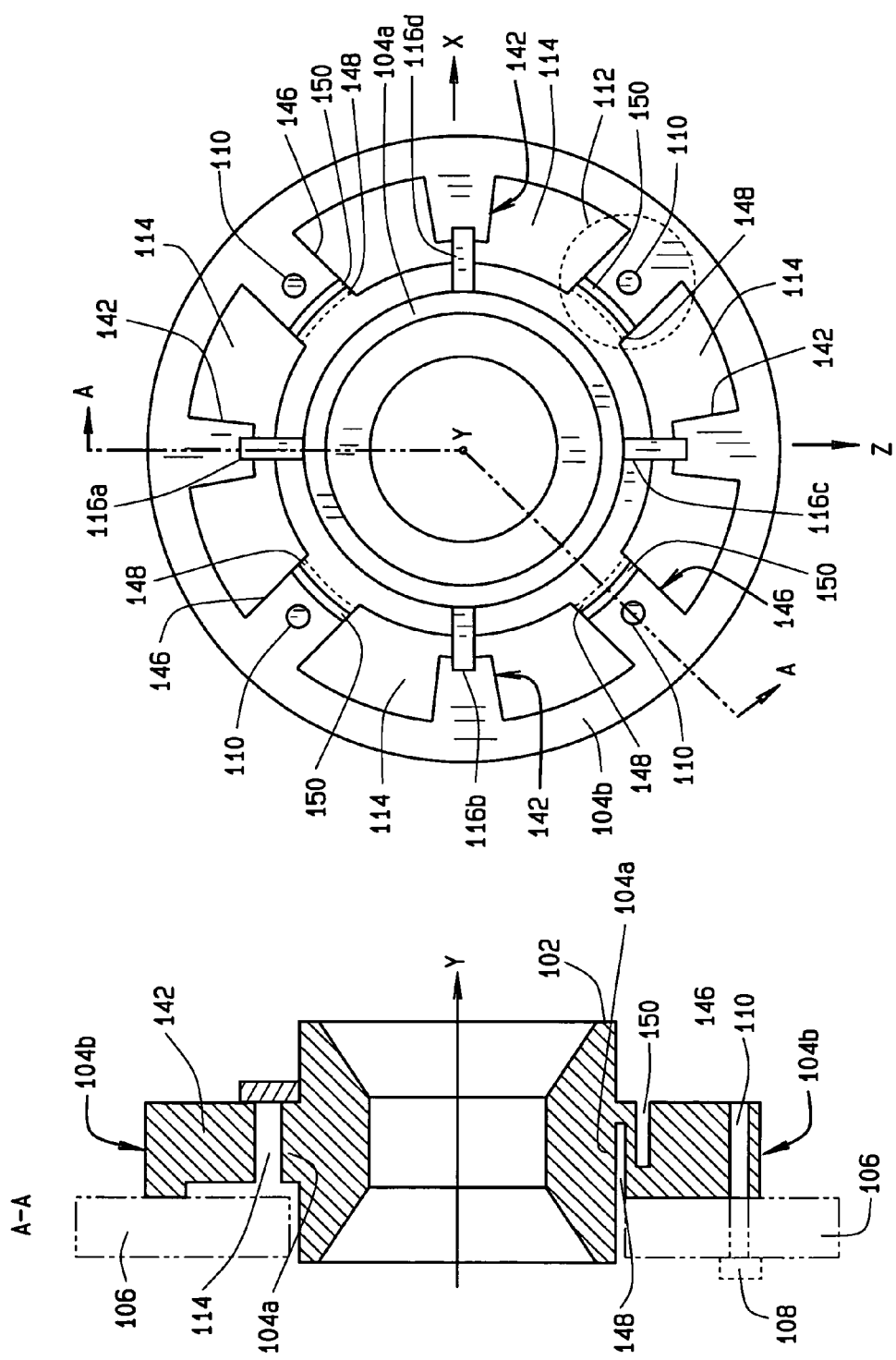

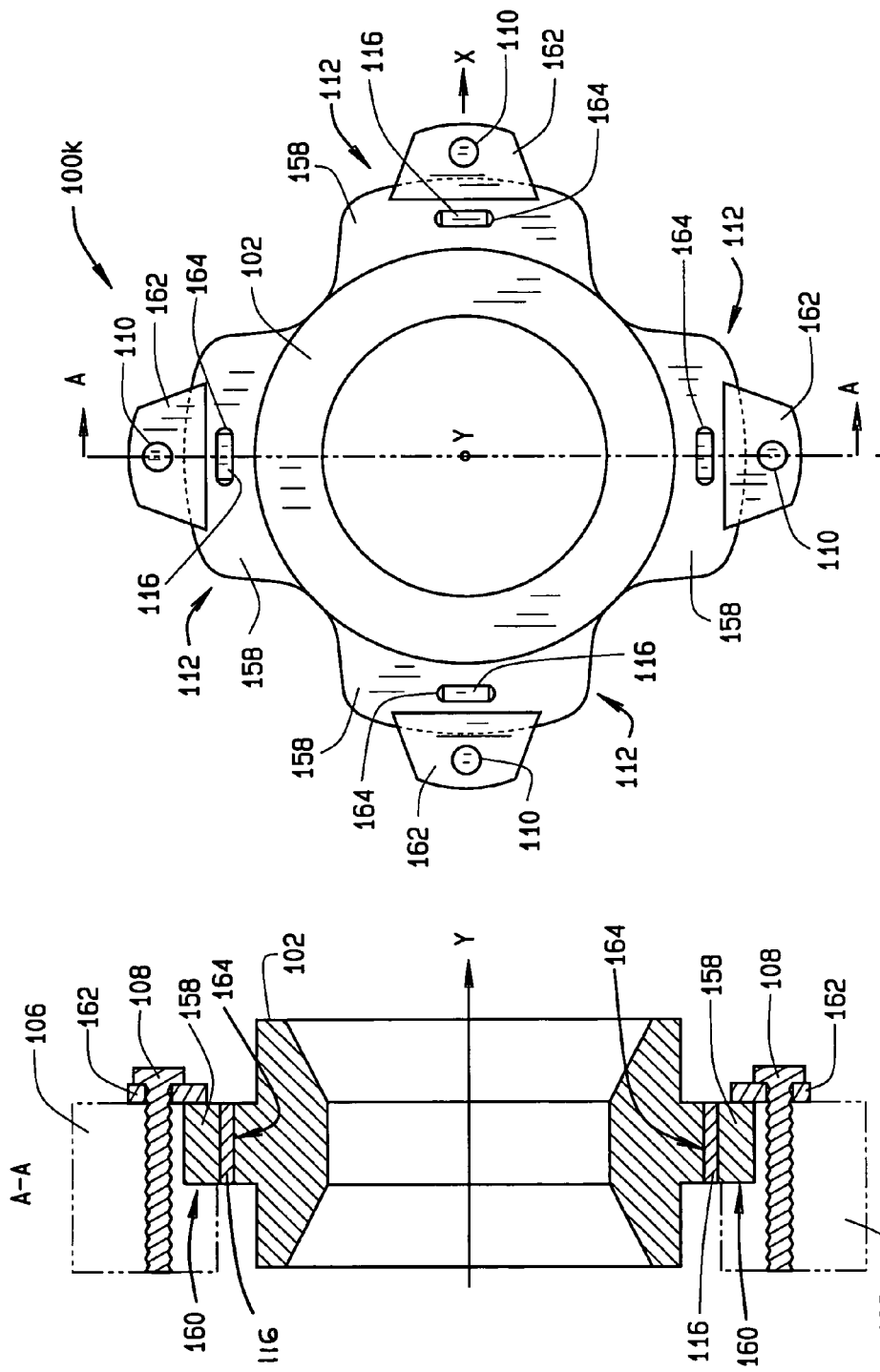

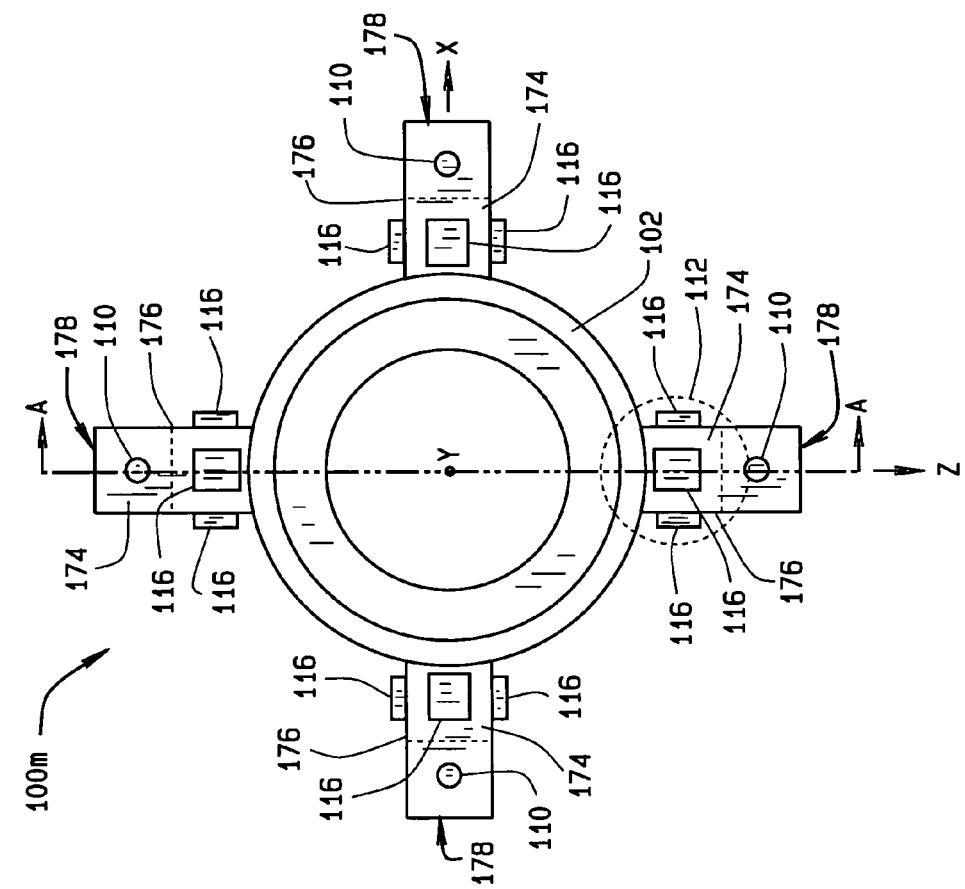
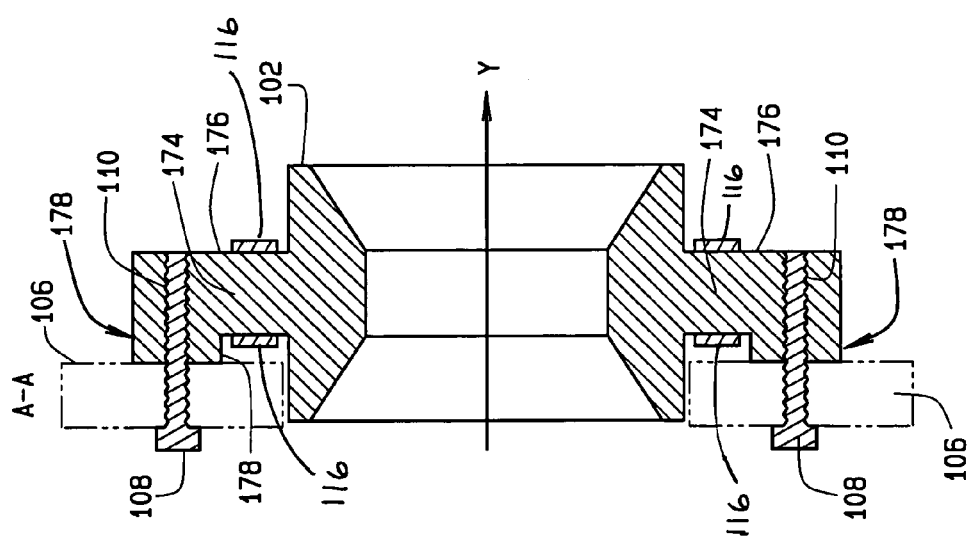

LOAD-SENSING BEARING

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

As used herein, it wilt be understood that the terms outer race and cup (102) are used interchangeably.

The present invention relates generally to bearings and, in particular to a bearing assembly configured with sensors to monitor applied forces and torques to provide responsive signals for use by devices, which monitor the bearing loads.

The bearing assembly of the present invention may be used to measure radial forces, thrust force, tilting moments, rotation speeds, and temperature at the bearing for use in many applications such as Vehicle Dynamics Control Systems (Vehicle Stability Control Systems), vehicle rollover prevention systems, tire-integrity monitoring systems, road-condition monitoring systems, and vehicle suspension-control systems.

There are a number of applications where the loads and types of loads placed on a bearing assembly in operation can provide significant information about the bearing and the objects attached to the bearing assembly. For example, in the automotive industry, bearing loading information, in electrical signal form, is utilized by a Vehicle Dynamics Control ("VDC") Systems to monitor the driving conditions of the vehicle, enabling the system to control the torque supplied to the vehicle wheels. An antifriction rolling bearing disclosed in U.S. Pat. No. 5,140,849 to Fujita et al. uses two strain gages to monitor the general loads applied to a bearing. However, the '849 Fujita et al. bearing assembly is unable to provide the multi-faceted data needed by high-level VDC electronic systems or by the processor-controlled systems in the rolling-mills industry or the machine-tool industry.

U.S. Pat. No. 4,748,844 to Yoshikawa et al. discloses a load-detection device related to the automotive industry, consisting of a multi-component load cell structure fixed to a hub on which a road wheel is mounted. The load cell structure is attached so as to rotate with the tire of the wheel. However, the device disclosed in the '844 Yoshikawa et al. patent cannot provide signals indicating all loads and all torques required to enable a high level VDC electronic device or other such monitoring devices to function properly. In particular, the device employs strain gages in only one plane, perpendicular to the axis about which the wheel rotates. As a result, the signals from the strain gages on the device are unable to detect the forces tending to cause a vehicle to skid sideways or to roll the vehicle over.

In the steel production industry, steel rolling mills utilize electronic processing and control to manipulate the speed and loads associated with rollers during a steel rolling process. Specifically, rolling mills need bearing feedback regarding indications of a belt slipping on rollers or indications that a particular set of rollers is experiencing higher loads and torques.

Similarly, in the machine tool industry, programmable controllers and processors monitor and control the speed and loads associated with spindles in a variety of milling, cutting, and drilling machines. Computer controlled machine tools monitor the amount of force and torque being experienced by bearings supporting a spindle in order to assess whether cutting and drilling tools have become dull or whether the cutting or drilling force, torque, and speeds exceed the limits established for proper machining operations.

BRIEF DESCRIPTION OF THE SEVERAL VIEWS OF THE DRAWINGS

In the accompanying drawings which form part of the specification:

FIG. 2A illustrates a front view of an alternate load sensing bearing assembly configuration of the present invention;

FIG. 2B illustrates a sectional view of the load sensing bearing assembly of FIG. 2A, taken along segment A-A.

FIG. 9A illustrates a front view of an alternate load sensing bearing assembly configuration of the present invention;

FIG. 9B illustrates a sectional view of the load sensing bearing assembly of FIG. 9A, taken along segment A-A.

FIG. 10A illustrates a front view of an alternate load sensing bearing assembly configuration of the present invention;

FIG. 10B illustrates a sectional view of the load sensing bearing assembly of FIG. 10A, taken along segment A-A.

FIG. 12A illustrates a front view of an alternate load sensing bearing assembly configuration of the present invention;

FIG. 12B illustrates a sectional view of the load sensing bearing assembly of FIG. 12A, taken along segment A-A.

FIG. 14A illustrates a front view of an alternate load sensing bearing assembly configuration of the present invention;

FIG. 14B illustrates a sectional view of the load sensing bearing assembly of FIG. 14A, taken along segment A-A.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

Figures 1A, 1B:
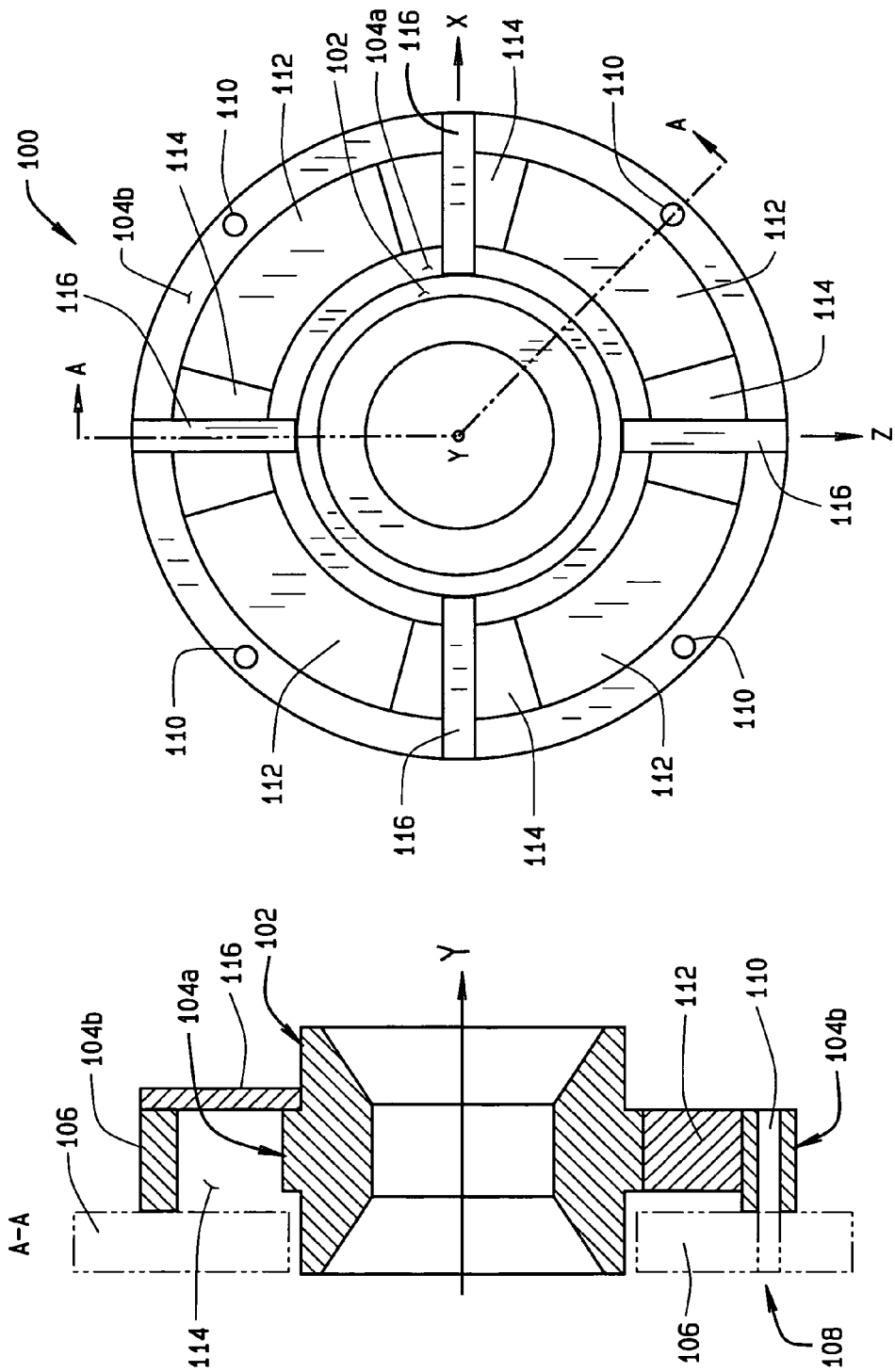
FIG. 1A illustrates a front view of a load sensing bearing assembly of the present invention.
FIG. 1B illustrates a sectional view of the load sensing bearing assembly of FIG. 1A, taken along segment A-A.

Turning to the figures, FIGS. 1A and 1B illustrate a general load sensing bearing assembly 100 of the present invention. The load-sensing bearing assembly 100 is generally constructed to support an inner race or cone (not shown) and rolling elements (not shown, but which can be any type of rolling elements such as, but not limited to, tapered, cylindrical, ball, needle, or spherical). The load-sensing bearing assembly 100 includes a bearing outer race or cup 102 which can assume any orientation about the Y-axis, and a flange assembly 104 for attachment of the bearing outer race or cup 102 to an application structure 106 by a suitable number of attachment bolts 108 secured with associated bolt holes 110 in the flange assembly 104. Exemplary bearing structures are the UNIPAC- and TS-style of bearing assemblies manufactures and sold by The Timken Company of Canton, Ohio.

The flange assembly 104 consists of an inner annular flange 104A, and an outer annular flange 104B, coupled together by a set of annularly spaced anisotropic spring regions 112 which are disposed between the annular flanges 104a and 104b, linking them together. Those of ordinary skill in the art will recognize that the inner annular flange 104a may be integrally formed with the bearing cup 102, and correspondingly, that the outer annular flange 104b may be integrally formed with the application structure 106.

As shown in FIG. 1A, four equally spaced anisotropic spring regions 112 are illustrated as disposed between the inner annular flange 104a and outer annular flange 104b, but more or fewer may be utilized within the scope of the invention. Gaps 114 disposed between the anisotropic spring regions 112 facilitate deformation of the anisotropic spring regions 112, and allow for a limited range of displacement and/or rotation of the bearing cup 102 and inner annular flange 104a relative to the outer annular flange 104b and application structure 106. In essence, the bearing cup 102 and the inner annular flange 104a are suspended within the outer annular flange 104b, therefore, forces and/or moment applied to the bearing assembly 100 from rotating components supported within the bearing cup 102 will cause the bearing cup 102 to displace and/or rotate with respect to the outer annular flange 104b and the application structure 106.

Those of ordinary skill in the art will recognize that the anisotropic spring regions may be constructed of a variety of shapes and materials, and in a variety of configurations such as shown below in the various alternate embodiments, and which may include webs and elastomeric materials. The function of each anisotropic spring region is to permit a limited range of displacement and/or rotation of the bearing cup 102 and inner annular flange 104a relative to the outer annular flange 104b and supporting application structure 106 as described above.

To measure and monitor the displacement and/or rotation of the bearing cup 102 and inner annular flange 104a relative to the outer annular flange 104b and application structure 106, a set of sensor modules 116 are disposed across the gaps 114, linking the inner annular flange 104a to the outer annular flange 104b. Each sensor module 116 includes at least one sensor unit which is capable of measuring displacement, rotation, or strain, such that the set of sensor modules 116 as a whole provides measurements which are representative of the applied forces (Fx, Fy, Fz) and applied moments (Mx and Mz). The amount of deformation provided by the anisotropic spring regions 112 must be sufficient to allow the sensors modules 116 to detect and measure the particular applied forces and/or moments intended to be measured.

The sensor modules 116 may also contain a temperature sensor or other type of sensor (e.g. speed sensors or accelerometers) that may be important for the end application in which the bearing assembly 100 is to be used, such as condition monitoring. When a temperature sensor is utilized in a sensor module 116 for thermal compensation, it is preferably placed in close proximity to an associated strain sensor. Those of ordinary skill in the art will recognize that the sensor units utilized within the sensor modules 116 may employ any suitable strain, displacement, rotation, or temperature sensor technology, such as, but not limited to, metal foil, piezoresistive, MEMS, vibrating wire, capacitive, inductive, optical, ultrasonic, etc. Similarly, quarter-, half-, or full-bridge strain sensors may be utilizes as are known in the art.

Preferably, the signals accumulated from the set of sensor modules 116 are analyzed to produce measurements of the applied radial force components (Fx and Fz), thrust force component (Fy), tilting moment components (Mx and Mz), and bearing temperature (if at least one temperature sensor is included in the set of sensors 116) for the load-sensing bearing 100. More specifically, the set of sensor modules 116 preferably provides measurement for at least one of five degrees of freedom Fx, Fy, Fz, Mx, and Mz. The measurement of temperature may be used to compensate for known thermal effects on the sensor units within the sensor modules 116, as well as directly for use as a measurement parameter in an end application.

In the embodiment of FIGS. 1A and 1B, the anisotropic spring regions 112 can assume a wide variety of orientations about the Y-axis of the bearing assembly 100. The anisotropic spring regions 116 may be of any of a wide variety of conventional designs to enhance movement between the bearing cup 102 and the outer annular flange 104b, so as to increase or reduce the values obtained by the set of sensor modules 116. Alternatively, the anisotropic spring regions 112 may be designed to enhance only specific movements between the bearing cup 102 and the outer annular flange 104b to increase or reduce specific forces required to obtain data to determine the values for the forces Fx, Fy, Fz, or moments Mx, Mz, that may be experienced by the load-sensing bearing assembly 100.

It will be appreciated by those of ordinary skill in the art that there are number of methods that may be used to analyze the signals from the set of sensors modules 116 associated with the bearing assembly 100 of the present invention to determine values of the forces and moments acting on the load-sensing bearing assembly 100. For example, a Finite-Element Analysis will allow the signals provided by the sensors modules 116 to be analyzed and converted into a numerical value for each of the three components of force, Fx, Fy, and Fz, and two components of the moment, Mx and Mz. Other analytical tools are well known in the art and are intended to be within the scope of the present invention. Experimental methods, also well known in the art, may be used to calibrate the signals from the sensor modules 116 according to the applied forces and moments.

The general premise for the load sensing bearing assembly 100 of the present invention, and the various alternate embodiments, is that the structures supporting the bearing cup 102 relative to the application structure 106 include at least one anisotropic spring region 112 between the bearing cup 102 and the bolts 108 or other attachment points to the application structure 106. With the anisotropic spring region(s) 112 suspending the bearing cup from the application structure 106, forces and/or moments applied to the bearing assembly 100 will cause the bearing cup 102 to displace and/or rotate with respect to the application structure 106. A set of displacement, rotation and/or strain sensors 116, strategically placed about the bearing cup 102, anisotropic spring region(s) 112, or supporting structure measure the relative bearing cup displacements, strains, and/or rotations. The signals from the set of sensor modules 116 are used to produce measures of the applied radial forces, thrust forces, and tilting moments.

The following description associated with FIG. 2A through FIG. 15C describes a variety of alternative embodiments of the load sensing bearing assembly 100 of the present invention which incorporate the above principles of establishing anisotropic spring regions 112 within the bearing assembly 100 that are monitored by an set of sensor modules 116 to generate signals representative of applied radial forces, thrust forces, tilting moments, and/or bearing temperatures.

FIGS. 2A and 2B illustrate an alternate embodiment for the load-sensing bearing assembly 100, indicated generally as 100a. Four equally spaced anisotropic spring regions 112 are disposed around the outer circumference of an inner annular flange 104a supporting the bearing cup 102. The center of each anisotropic spring region 112 is generally located about 45 degrees from the X-axis. Each of the anisotropic spring regions 112 includes an axial beam 118 generally aligned parallel to the Y-axis, integral at one end by with an inner cross beam 120 coupled to the inner annular flange 104a supporting the bearing cup 102, and integral at an opposite end with an outer cross beam 122 coupled to the outer annular flange 104b which is secured to the application structure 106. Within each anisotropic spring region 112, the inner annular flange 104a, inner cross beam 120, and axial beam 118 define an inner channel 124, while the outer annular flange 104b, outer cross beam 122, and axial beam 118 define an outer channel 126. The combination of beams and channels permits a limited range of displacement and/or rotation of the bearing cup 102 relative to the application structure 106. A resilient material (not shown) may be utilized to fill the channels 124 and 126. Preferably, the resilient material is selected to permit a desired range of movement between the inner annular flange 104a and the outer annular flange 104b and to prevent unwanted materials (e.g. road debris) from entering the channels 124 and 126. For example, a polyurethane material may be used if it meets the operating parameters of the application.

Within the bearing assembly 100a, a set of five sensor modules 116a-116e form an array with each sensor module 116 bridging the gap 114 between the inner annular flange 104a and the outer annular flange 104b. Each sensor module 116 includes at least one sensor unit which is capable of measuring displacement, rotation, or strain, such that the set of sensor modules 116 as a whole provides measurements which are representative of the applied forces (Fx, Fy, Fz) and applied moments (Mx and Mz), as previously described.

In an exemplary configuration, sensor module 116a may include a displacement sensor aligned with the Z-axis to measure displacements in the Z direction, and to provide information about the force Fz acting on the bearing assembly 100a. Sensor module 116c may include a displacement sensor aligned with the X-axis to measure displacements in the X direction, and to provide information about the force Fx acting on the bearing assembly 100a. Sensor modules 116b, 116d, and 116e, each configured with displacement sensors to measure displacements in the Y-axis are shown disposed at about 120 degree intervals about the Y axis, with the sensor module 116d aligned with the Z-axis. Together, displacement sensor modules 116b, 116d, and 116e provide signals that enable a determination of the value for the force Fy and the moments Mx and Mz.

In an alternate exemplary configuration, sensor modules 116b, 116d, and 116e may be eliminated in favor of integrating a rotation sensor and at least one Y-axis displacement sensor into sensor modules 116a and 116c. If the sensor module 116a contains the Y-axis displacement sensor, sensor module 116a would provide measurements of displacements in the Y-direction and Z-direction, as well as rotation about the Z-axis. The measured displacement in the Z-direction provides information about the force Fz, and the measured rotation about the Z-axis provides information about the moment Mz. Sensor module 116c would, in-turn, provide measurements of displacement in the X-direction and rotation about the X-axis. The measured displacement in the X-direction provides information about the force Fx, and the measured rotation about the X-axis provides information about the moment Mx. The displacements measured in the Y-direction by the Y-axis displacement sensor in sensor module 116a can be combined with the measured rotations about the X-axis to provide measurements of the force Fy.

Figures 3A, 3B:
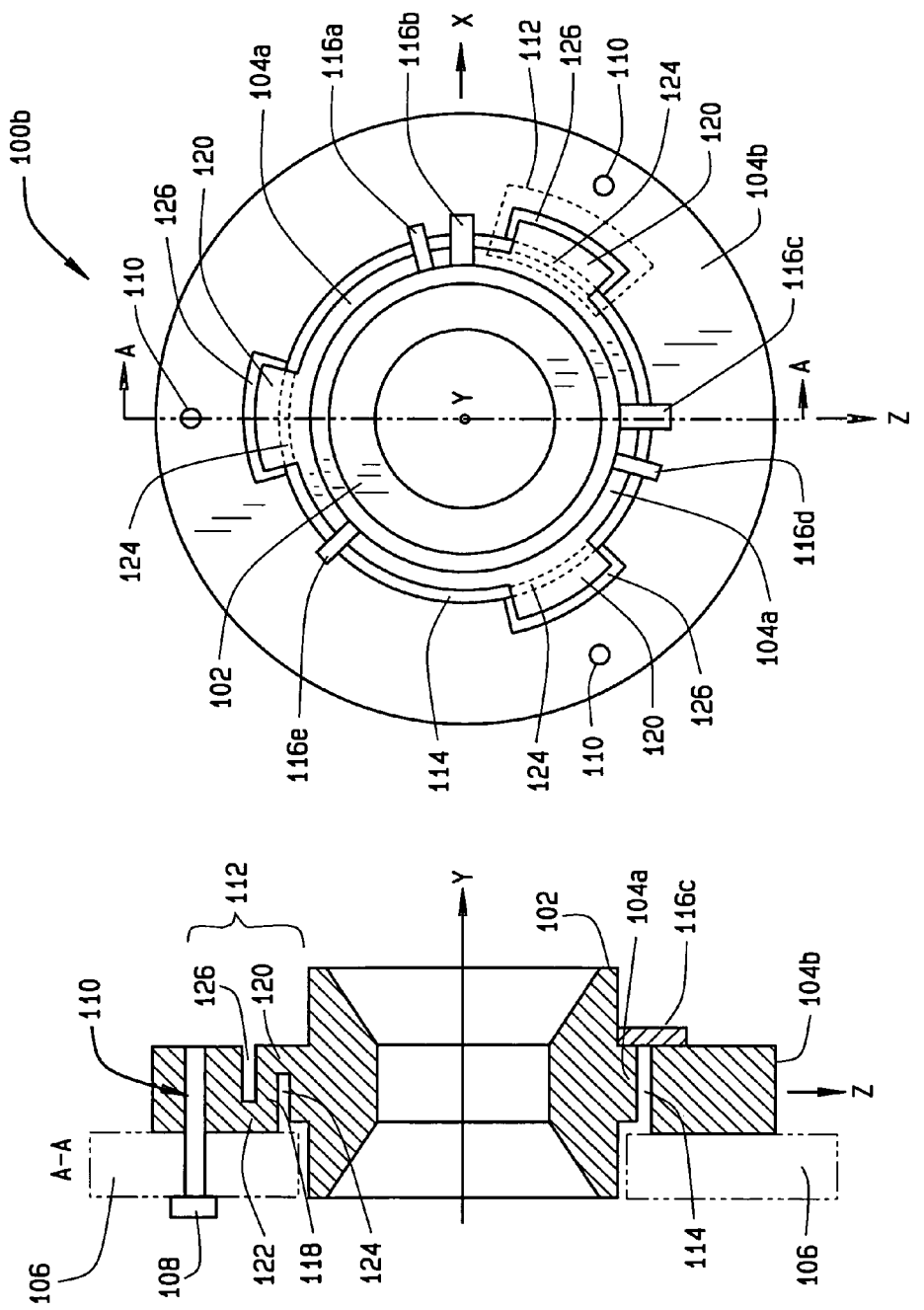
FIG. 3A illustrates a front view of an alternate load sensing bearing assembly configuration of the present invention.
FIG. 3B illustrates a sectional view of the load sensing bearing assembly of FIG. 3A, taken along segment A-A.

FIGS. 3A and 3B illustrate a similar alternate embodiment for the load-sensing bearing assembly 100, indicated generally as 100b. Instead of four anisotropic spring regions 112, a total of three equally spaced anisotropic spring regions 112 are disposed around the outer circumference of an inner annular flange 104a supporting the bearing cup 102. Each of the anisotropic spring regions 112 includes an axial beam 118 generally aligned parallel to the Y-axis, integral at one end with an inner cross beam 120 coupled to the inner annular flange 104a supporting the bearing cup 102, and integral at an opposite end with an outer cross beam 122 coupled to the outer annular flange 104b which is secured to the application structure 106. Within each anisotropic spring region 112, the inner annular flange 104a, inner cross beam 120, and axial beam 118 define an inner channel 124, while the outer annular flange 104b, outer cross beam 122, and axial beam 118 define an outer channel 126. The combination of beams and channels permits a limited range of displacement and/or rotation of the bearing cup 102 relative to the application structure 106. A resilient material (not shown) may be utilized to fill the channels 124 and 126. Preferably, the resilient material is selected to permit a desired range of movement between the inner annular flange 104a and the outer annular flange 104b and to prevent unwanted materials (e.g. road debris) from entering the channels 124 and 126. For example, a polyurethane material may be used if it meets the operating parameters of the application.

Within the bearing assembly 100b, a set of five sensor modules 116a-116e form an array with each sensor module 116 bridging the gap 114 between the inner annular flange 104a and the outer annular flange 104b. Each sensor module 116 includes at least one sensor unit which is capable of measuring displacement, rotation, or strain, such that the set of sensor modules 116 as a whole provides measurements which are representative of the applied forces (Fx, Fy, Fz) and applied moments (Mx and Mz), as previously described.

In an exemplary configuration, sensor module 116c may include a displacement sensor aligned with the Z-axis to measure displacements in the Z-direction, and provide information about the force Fz acting on the bearing assembly 100b. Sensor module 116b may include a displacement sensor aligned with the X-axis to measure displacements in the X direction, and provide information about the force Fx acting on the bearing assembly 100b. Sensor modules 116a, 116d, and 116e, each configured with displacement sensors to measure displacements in the Y-axis are shown disposed at about 120 degree intervals about the Y-axis. Together, displacement sensor modules 116a, 116d, and 116e provide signals that enable a determination of the value for the force Fy and the moments Mx and Mz.

In an alternate exemplary configuration, sensor modules 116a, 116d, and 116e may be eliminated in favor of integrating a rotation sensor and at least one Y-axis displacement sensor into sensor modules 116b and 116c. If the sensor module 116c contains the Y-axis displacement sensor, sensor module 116c would provide measurements of displacements in the Y-direction and Z-direction, as well as rotation about the Z-axis. The measured displacement in the Z-direction provides information about the force Fz, and the measured rotation about the Z-axis provides information about the moment Mz. Sensor module 116b would, in-turn, provide measurements of displacement in the X-direction and rotation about the X-axis. The measured displacement in the X-direction provides information about the force Fx, and the measured rotation about the X-axis provides information about the moment Mx. The displacements measured in the Y-direction by the Y-axis displacement sensor in sensor module 116c can be combined with the measured rotations about the X-axis to provide measurements of the force Fy.

Figures 4A, 4B:
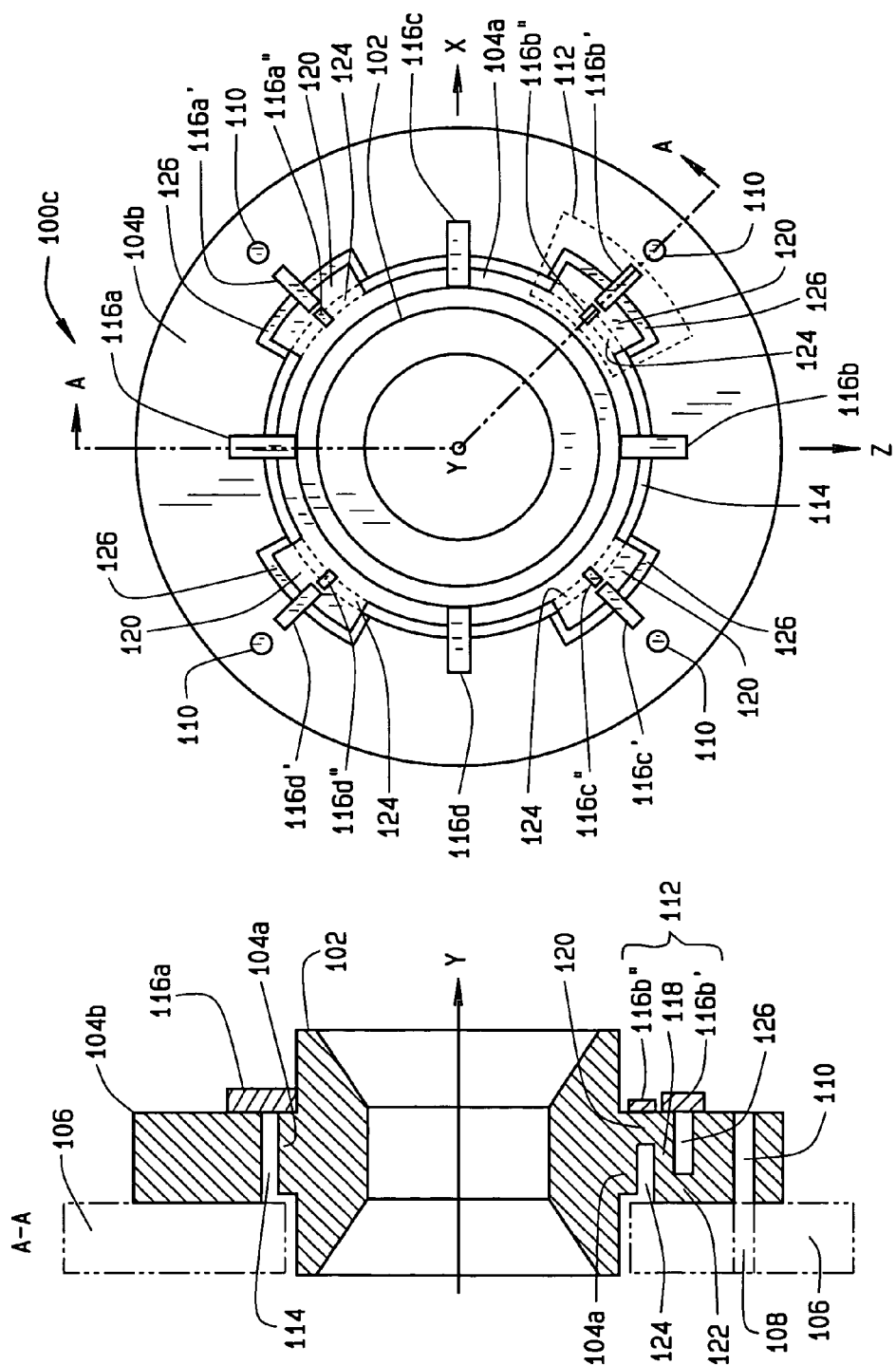
FIG. 4A illustrates a front view of an alternate load sensing bearing assembly configuration of the present invention.
FIG. 4B illustrates a sectional view of the load sensing bearing assembly of FIG. 4A, taken along segment A-A.

FIGS. 4A and 4B illustrate an alternate embodiment of the load sensing bearing assembly 100 of the present invention, indicated generally at 100c, in which the outer annular flange 104b is secured to an application structure 106 by bolts 108 secured within bolt holes 110. In this embodiment, the anisotropic spring regions 112 are identical to those shown in FIGS. 2A and 2B, however the placement, type and quantity of the sensor modules 116 are different. More specifically, in a first variation, the array of sensor modules 116 includes two displacement and rotation sensor modules 116a, 116b aligned to the Z-axis and two displacement and rotation sensor modules 116c, 116d aligned to the X-axis of a bearing cup 102 and annular flanges 104a, 104b, with each of the sensor modules 116 bridging the gap 114 between the inner annular flange 104a and outer annular flange 104b.

Optionally, in a second variation as indicated at 116a', 116b', 116c', and 116d', the four displacement and rotation sensor modules 116 may instead be disposed on the radial centerlines of each of the four anisotropic regions 112 to bridge the outer channel 126 between the axial beam 118 and the outer annular flange 104b. Signals from the sensor modules 116a'-116d' are utilized to calculate the values of three forces, Fx, Fy, and Fz, and two moments, Mx and Mz acting on the load sensing bearing assembly 100c.

Optionally, in a third variation as indicated at 116a", 116b", 116c", and 116d", the four sensor modules 116, including at least one strain sensor each, may instead be disposed on the radial centerlines of each of the four anisotropic spring regions 112, on the inner cross beams 120 over the inner channel 124 defined by the inner annular flange 104a and the axial beam 118. Signals from the sensor modules 116a"-116d" are utilized to calculate the values of three forces, Fx, Fy, and Fz, and two moments, Mx and Mz acting on the load sensing bearing assembly 100c. Those of ordinary skill in the art will readily recognize that other combinations of sensor modules 116 can be used to provide measurements of three forces, Fx, Fy, and Fz, as well as the two moments, Mx and Mz acting on the load sensing bearing assembly 100c.

Figure 5A:
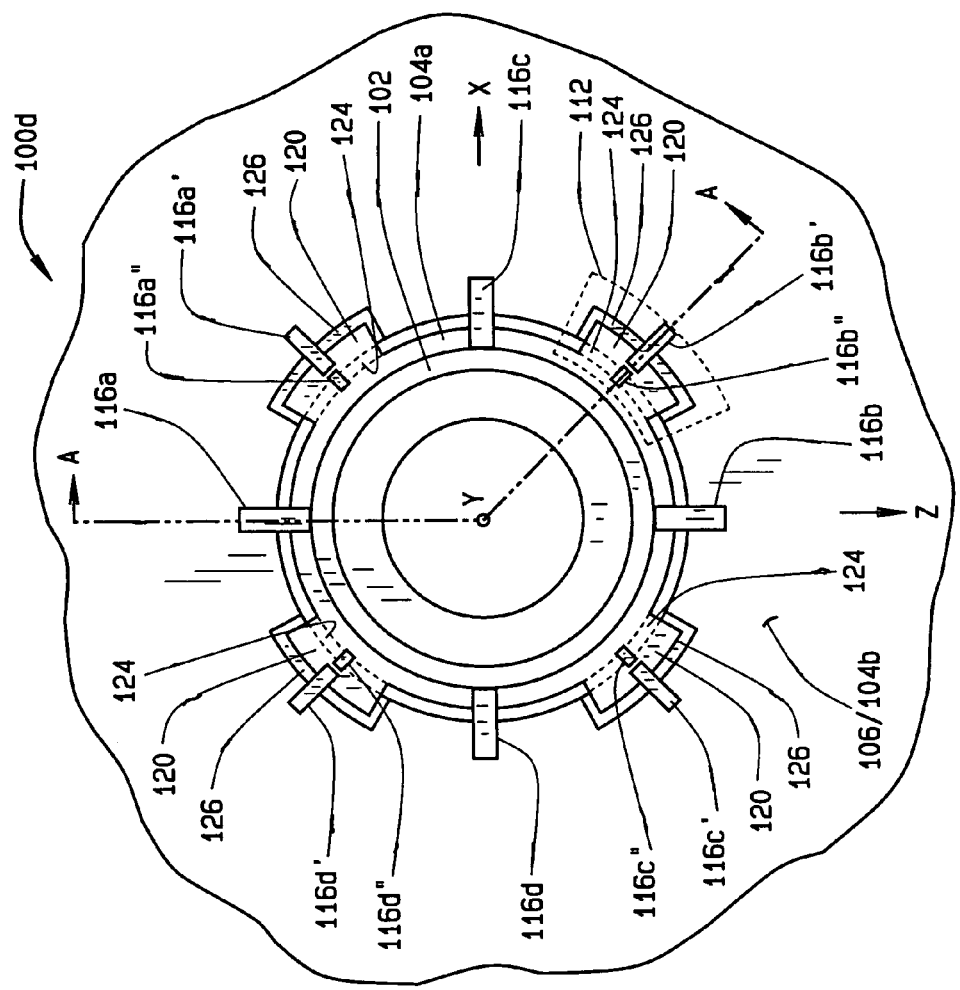
FIG. 5A illustrates a front view of an alternate load sensing bearing assembly configuration of the present invention.
Figure 5B:
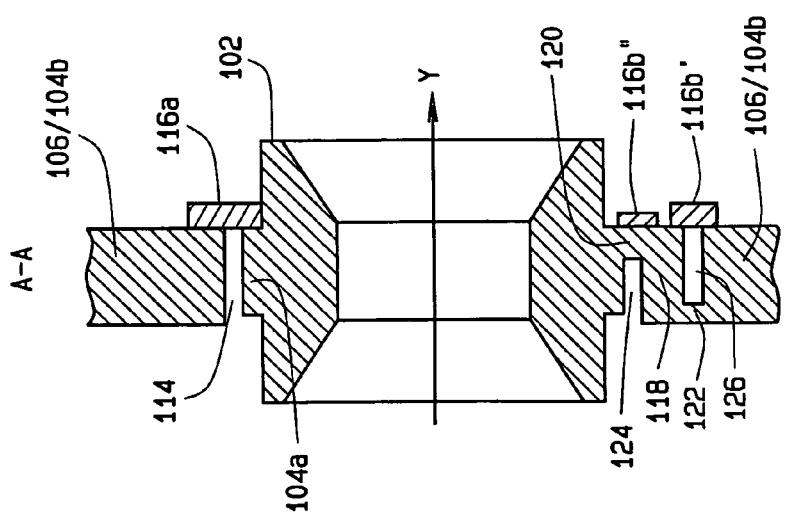
FIG. 5B illustrates a sectional view of the load sensing bearing assembly of FIG. 5A, taken along segment A-A.

Those of ordinary skill in the art will readily recognize that the outer annular flange 104b of the various embodiments of the load sensing bearing assembly 100 described herein may be integrally formed with the application structure 106 associated with the load sensing bearing assembly 100, eliminating bolts 108 and bolt holes 110. For example, as shown in FIGS. 5A and 5B, a load sensing bearing assembly 100d is shown which is substantially identical to load sensing bearing assembly 100c shown in FIGS. 4A and 4B, with the exception that the application structure 106 is integral with, and defines, the outer annular flange 104b. The specific shape and configuration of the application structure 106 will vary, depending upon the particular application in which the load sensing bearing assembly 100d is to be utilized.

Figures 6A, 6B:
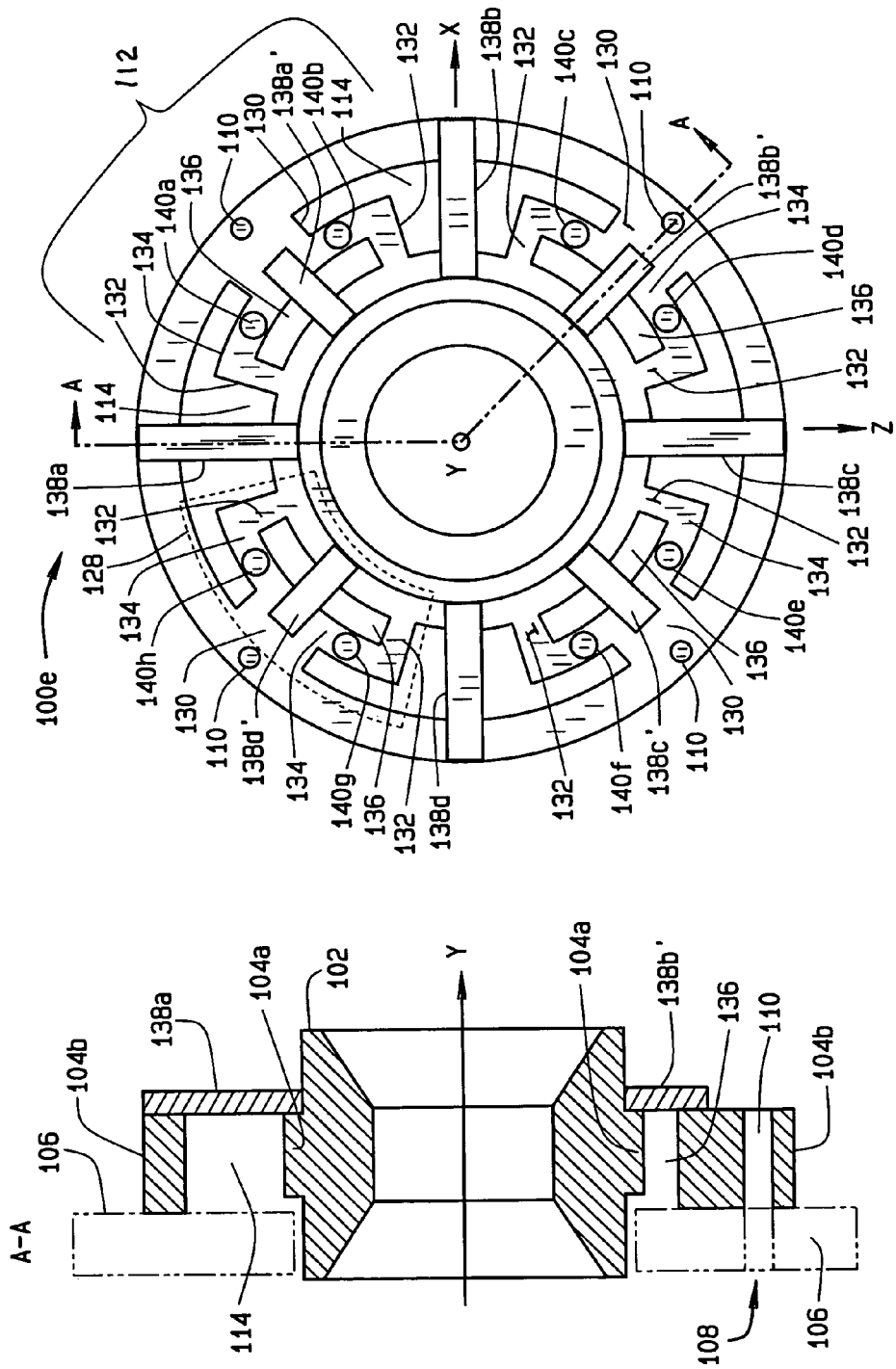
FIG. 6A illustrates a front view of an alternate load sensing bearing assembly configuration of the present invention.
FIG. 6B illustrates a sectional view of the load sensing bearing assembly of FIG. 6A, taken along segment A-A.

FIGS. 6A and 6B illustrate an alternate embodiment of the load sensing bearing assembly 100 of the present invention, indicated generally at 100e, utilizing an alternative style of anisotropic spring regions 112 and an alternative array of sensor modules 116. In this embodiment, the anisotropic spring regions 112 comprise four equidistantly spaced connecting members 128 coupling the bearing cup 102 and inner annular flange 104a to the outer annular flange 104b of the load-sensor bearing 100e. Each of the connecting members 128 includes an outer radial spoke 130 coupled to the outer annular flange 104b, two inner radial spokes 132 coupled to the inner annular flange 104a, and a connecting element 134 linking the outer and inner radial spokes 130, 132. An enclosed channel 136 is defined by the inner annular flange 104a, the two inner radial spokes 132, and the connecting element 134 of each connecting member 128.

The array of sensor modules 116 utilized with the load sensing bearing 100e preferably includes two displacement sensor modules 138a and 138c arranged on the Z-axis over the gap 114 between the inner and outer annular flanges 104a, 104b, and two displacement sensor modules 138b and 138d arranged on the X-axis over the gap 114 between the inner and outer annular flanges 104a, 104b. The set of sensor modules 116 as a whole provides measurements which are representative of the applied forces (Fx, Fy, Fz) and applied moments (Mx and Mz), as previously described.

Figures 7A, 7B:
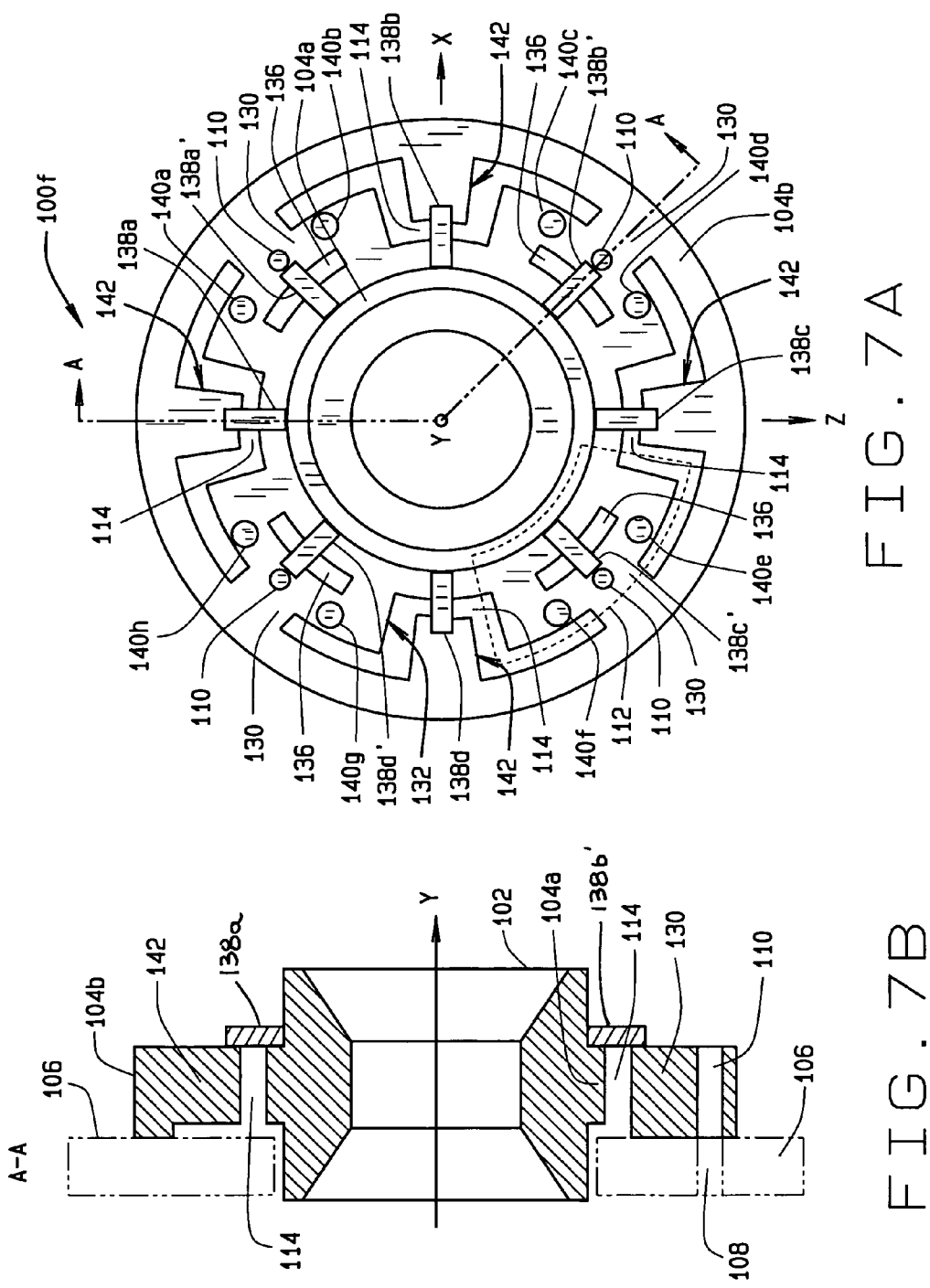
FIG. 7A illustrates a front view of an alternate load sensing bearing assembly configuration of the present invention.
FIG. 7B illustrates a sectional view of the load sensing bearing assembly of FIG. 7A, taken along segment A-A.

FIGS. 7A and 7B illustrate a variation of the embodiment of the load sensing bearing assembly 100e shown in FIGS. 6A and 6B, in which a tab 142 extends radially inward from the outer annular flange 104a between each anisotropic spring region 112. Each tab 142 provides an attachment point for a displacement sensor 138 in an array of sensor modules 116, reducing the width of the gap 114 over which each displacement sensor 138 is disposed.

In a first variation of the embodiments shown in FIGS. 6A-7B, the array of sensor modules 116 includes four displacement sensor modules 138a', 138b', 138c', and 138d' disposed on the radial centerlines of the connecting members 128, between the inner annular flange 104a and the connecting elements 134 over the enclosed channels 136. The set of sensor modules 116 as a whole provides measurements which are representative of the applied forces (Fx, Fy, Fz) and applied moments (Mx and Mz), as previously described.

In a second variation of the embodiment shown in FIGS. 6A-7B, the array of sensor modules 116 includes eight strain sensor modules 140a through 140h disposed on the connecting elements 134 of the connecting members 128, on opposite sides of the outer radial spokes 130. The set of sensor modules 116 as a whole provides measurements which are representative of the applied forces (Fx, Fy, Fz) and applied moments (Mx and Mz), as previously described.

Figures 8A, 8B:
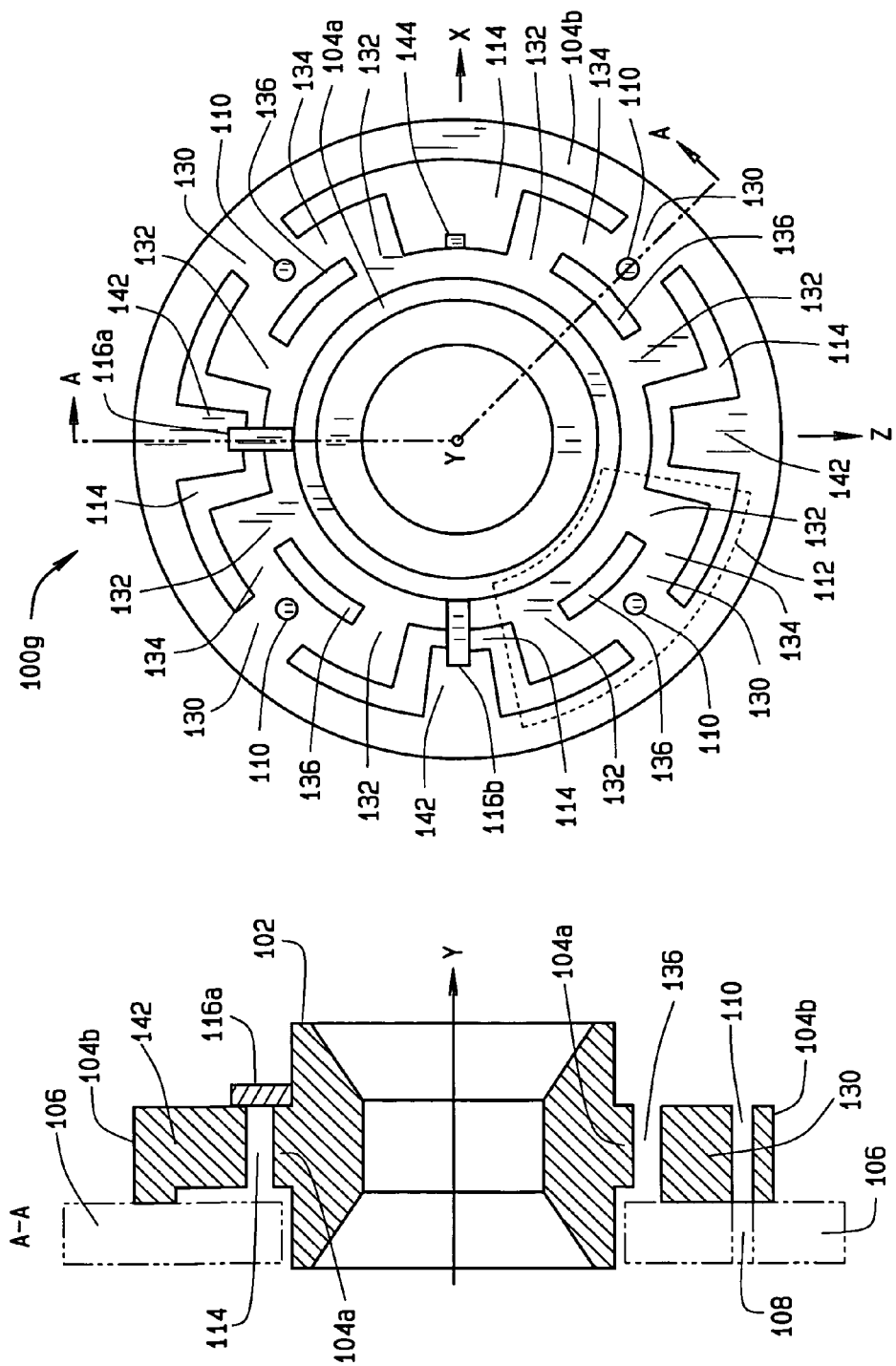
FIG. 8A illustrates a front view of an alternate load sensing bearing assembly configuration of the present invention.
FIG. 8B illustrates a sectional view of the load sensing bearing assembly of FIG. 8A, taken along segment A-A.

FIGS. 8A and 8B illustrates at 100g a variation of the embodiment of the load sensing bearing assembly 100f shown in FIGS. 7A and 7B, in which one of the tabs 142 is eliminated, and the array of sensor modules 116 is altered. A single sensor module 116a is radially aligned with the Z-axis between the inner annular flange 104a and a tab 142 over the gap 114, and a second sensor module 116b is radially aligned with the X-axis between the inner annular flange 104a and a second tab 142 over the gap 114. A speed sensor module 144 is coupled to the inner annular flange 104a and bearing cup 102 on the X-axis of the load sensing bearing assembly 100g, opposite from the second sensor module 116b. This alternate arrangement and type of anisotropic spring regions 112 coupled with the arrangement of sensor modules 116a, 116b, and 144 provides a set of sensor signals that can be used to calculate the values of the three forces, Fx, Fy, and Fz, and two moments, Mx and Mz, acting on the bearing cup 102, together with the bearing cup rotation speed.

FIGS. 9A and 9B illustrate an alternate embodiment of the load sensing bearing assembly 100 of the present invention, indicated generally at 100h, in which each anisotropic spring region 112 comprises a single radial spoke 146 coupling the inner annular flange 104a and the bearing cup 102 to the outer annular flange 104b and application structure 106. Each spoke 146 is equidistantly disposed about the Y-axis of the load sensing bearing assembly 100h, such as shown in FIG. 9A, in which four spokes 146 are illustrated. The spokes permit limited displacement and rotation of the inner annular flange 104a and bearing cup 102 relative to the outer annular flange 104b and application structure 106, in much the same manner as similar anisotropic spring region structures previously described.

The set of sensor modules 116 includes a first sensor module 116a radially aligned with the Z-axis between the inner annular flange 104a and a tab 142 over the gap 114, a second sensor module 116b radially aligned with the X-axis between the inner annular flange 104a and a second tab 142 over the gap 114, and a third sensor module 116c radially aligned with the Z-axis between the inner annular flange 104a and a tab 142 over the gap 114, opposite from the first sensor module 116a. A speed sensor module 144 is coupled to the inner annular flange 104a and bearing cup 102 on the X-axis of the load sensing bearing assembly 100h, opposite from the second sensor module 116b. This alternate arrangement and type of anisotropic spring regions 112 coupled with the arrangement of sensor modules 116a, 116b, 116c, and 144 provides a set of sensor signals that can be used to calculate the values of the three forces, Fx, Fy, and Fz, and two moments, Mx and Mz, acting on the bearing cup 102, together with the bearing cup rotation speed.

FIGS. 10A and 10B illustrate a variation on the embodiment shown in FIGS. 9A and 9B, in which the speed sensor module 144 is replaced with a fourth sensor module 116d radially aligned with the X-axis between the inner annular flange 104a and a tab 142 over the gap 114, opposite from the second sensor module 116b. In addition, within the structure of each spoke 146, a first channel 148 is formed across the width of one face of the spoke 146, and a second channel 150 is formed across the width of the opposite face of the spoke 146, radially displaced outward from the first channel 148. The first and second channels 148, 150 define an "S" shaped region within the structure of the spoke 146. This structure permits limited displacement and rotation of the inner annular flange 104a and bearing cup 102 relative to the outer annular flange 104b and application structure 106, in much the same manner as similar anisotropic spring region structures previously described. This alternate structure and arrangement of sensor modules 116a, 116b, 116c, and 116d provides a set of sensor signals that can be used to calculate the values of the three forces, Fx, Fy, and Fz, and two moments, Mx and Mz, acting on the bearing cup 102.

Figure 11A:
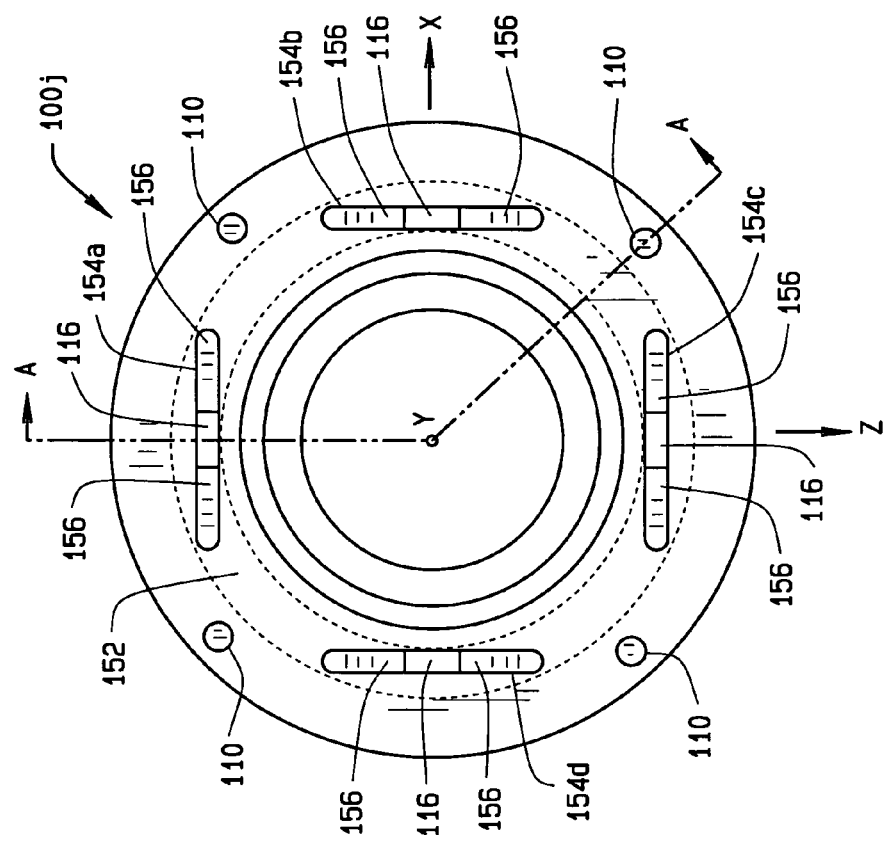
FIG. 11A illustrates a front view of an alternate load sensing bearing assembly configuration of the present invention.
Figure 11B:
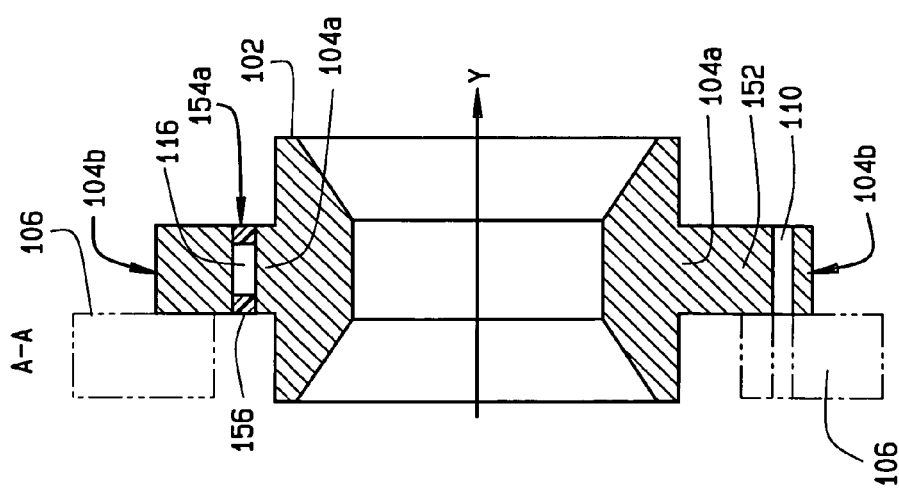
FIG. 11B illustrates a sectional view of the load sensing bearing assembly of FIG. 11A, taken along segment A-A.

FIGS. 11A and 11B illustrate an alternate embodiment of the load sensing bearing assembly 100 of the present invention, indicated generally as 100j, in which an annular anisotropic spring region 152 is disposed between the bearing cup 102 with inner annular flange 104a, and the outer annular flange 104b attached to the application structure 106. The annular anisotropic spring region 152 includes a set of four axially aligned, equidistantly disposed, slots 154a-154d passing through the flange assembly 104 parallel to the Y-axis. Slots 154a and 154c are perpendicular to the Z-axis, while slots 154b and 154d are perpendicular to the X-axis of the load-sensing bearing 100j. Each slot 154a-154d is filled with a soft or elastomeric fill 156.

To acquire measurements of the displacement and/or rotation of the bearing cup 102 relative to the application structure 106, a set of sensor modules 116 is disposed about the annular anisotropic spring region 152, with at least one sensor module 116 centrally disposed within each slot 154a-154d. The sensor modules 116 may each comprise at least one displacement and/or rotation sensor, or may include strain sensors sufficient to provide signals used to calculate the values of the three forces, Fx, Fy, and Fz, and two moments, Mx and Mz, acting on the bearing cup 102.

FIGS. 12A and 12B illustrate an alternate embodiment of the load sensing bearing assembly 100 of the present invention, indicated generally as 100k, in which the flange assembly 104 is not annular, but instead comprises a series of four equidistantly spaced flange protrusions 158 that extend radially outward from the bearing cup 102 and define the anisotropic spring regions 112. The load sensing bearing assembly 100k is secured to an application structure 106 by seating each of the flange protrusions 158 within a receiving notch 160 in the application structure. A bolt 108 is passed through a bolt hole 110 in an overlapping retaining clip 162, and coupled the application structure 106.

To measure the forces and moments acting on the load sensing bearing assembly 100k, each of the flange protrusions 158 is provided with a slot 164 within which is disposed a sensor module 116. The sensor modules 116 may each comprise at least one displacement and/or rotation sensor, or may include strain sensors sufficient to provide signals used to calculate the values of the three forces, Fx, Fy, and Fz, and two moments, Mx and Mz, acting on the bearing cup 102.

Figure 13A:
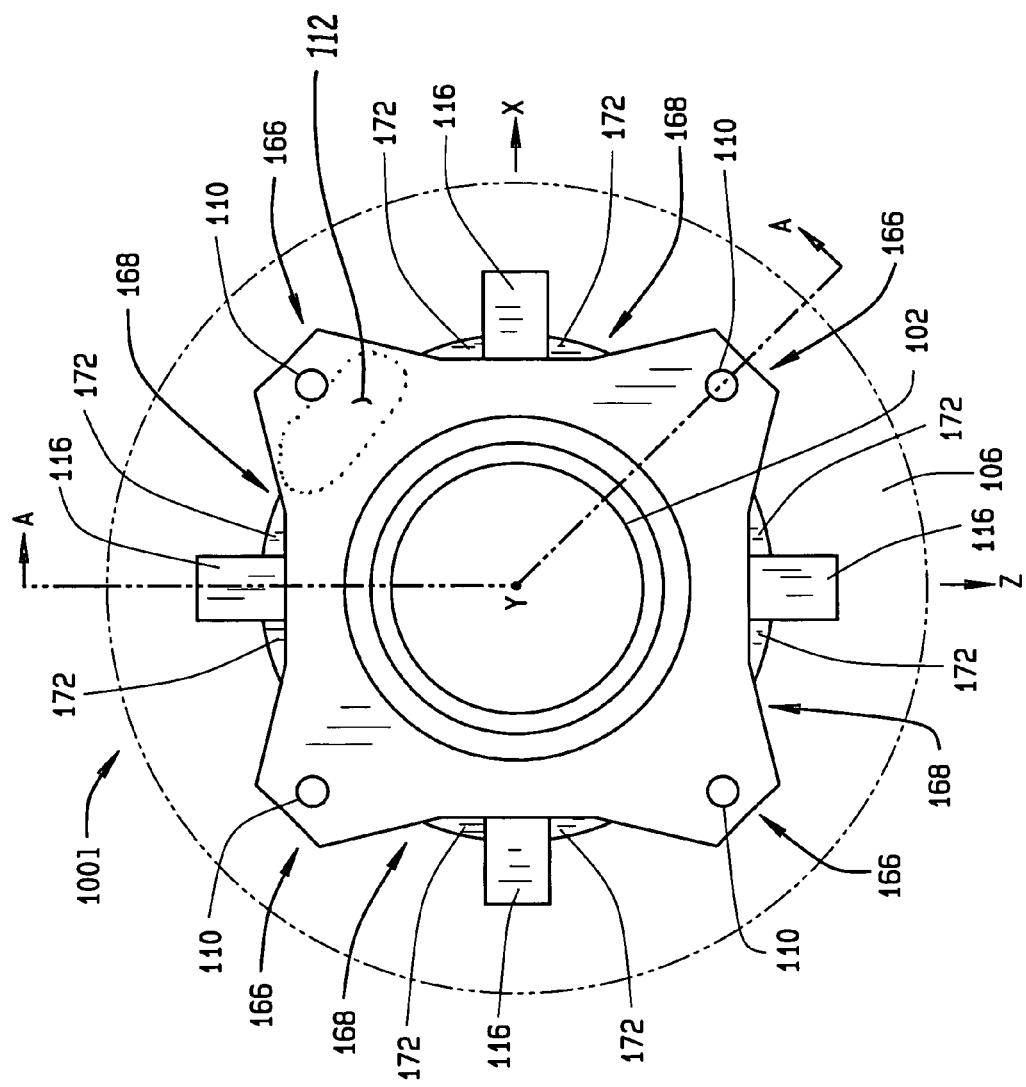
FIG. 13A illustrates a front view of an alternate load sensing bearing assembly configuration of the present invention.
Figure 13B:
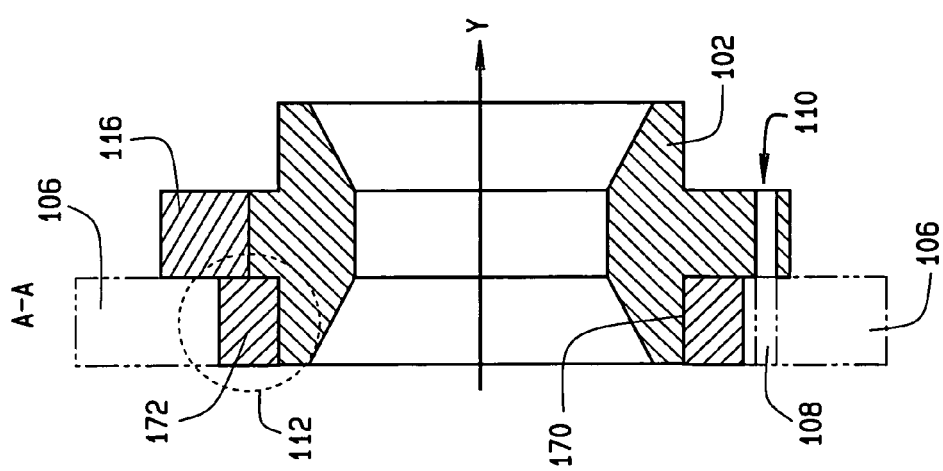
FIG. 13B illustrates a sectional view of the load sensing bearing assembly of FIG. 13A, taken along segment A-A.

FIGS. 13A and 13B illustrate an alternate embodiment of the load sensing bearing assembly 100 of the present invention, indicated generally at 100l, in which the bearing cup 102 is generally integrated with the flange assembly 104. The flange assembly 104 is substantially rectangular in shape, with truncated corners 166 and inwardly offset sides 168. Bolt holes 110 adjacent the truncated corners 166 of the flange assembly 104 receive bolts 108 for attachment of the load sensing bearing assembly 100l to the application structure 106.

As is best seen in FIG. 13B, the load sensing bearing assembly 100l is received within an oversize opening 170 within the application structure 106. The void between the load sensing bearing assembly 100l and application structure 106 can be filled with a soft elastomeric material 172 for sealing purposes. The regions between the bolt holes 110 and the bearing cup 102 of the load sensing bearing assembly 100l define the anisotropic spring regions 112. To measure the forces and moments acting on the load sensing bearing assembly 100l, a set of sensor modules 116 are disposed between each of the offset sides 168 of the flange assembly 104 and the application structure 106. The sensor modules 116 may each comprise at least one displacement and/or rotation sensor, or may include strain sensors sufficient to provide signals used to calculate the values of the three forces, Fx, Fy, and Fz, and two moments, Mx and Mz, acting on the bearing cup 102.

FIGS. 14A and 14B illustrate an alternate embodiment of the load sensing bearing assembly 100 of the present invention, indicated generally as 100m, in which the anisotropic spring regions 112 are substantially formed by four equidistantly spaced radial mounting posts 174 that protrude from the bearing cup 102. The four mounting posts 174 have a generally rectangular cross-section, defining four side surfaces 176, and include bolt holes 110 through an axially raised surface 178 for receiving bolts 108 to secure the bearing assembly 100m to the application structure 106. To measure the forces and moments acting on the load sensing bearing assembly 100m, a set of sensor modules 116 are disposed on the side surfaces 176 of at least one of the mounting posts 174 between the bearing cup 102 and the application structure 106. The set of sensor modules 116 comprises a sufficient number of displacement and/or strain sensors positioned to provide signals used to calculate the values of the three forces, Fx, Fy, and Fz, and two moments, Mx and Mz, acting on the bearing cup 102.

Figures 15A, 15B, 15C:
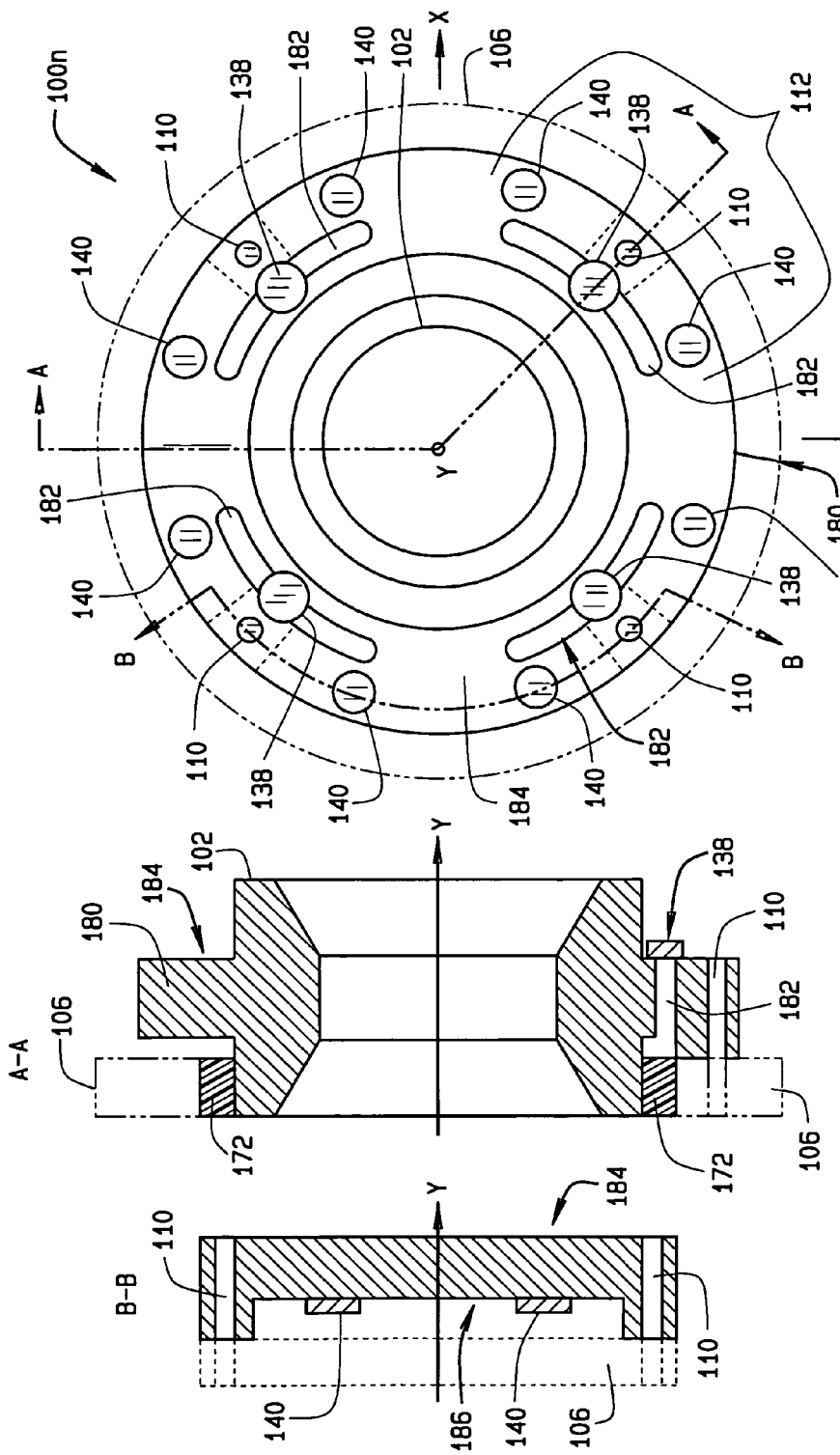
FIG. 15A illustrates a front view of an alternate load sensing bearing assembly configuration of the present invention.
FIG. 15B illustrates a sectional view of the load sensing bearing assembly of FIG. 15A, taken along segment A-A.
FIG. 15C illustrates a sectional view of the load sensing bearing assembly of FIG. 15A, taken along segment B-B.

FIGS. 15A through 15C illustrate an alternate embodiment of the load sensing bearing assembly 100 of the present invention, indicated generally at 100n, in which the flange assembly 104 is in the form of an annular member 180 integral with the bearing cup 102 and coupled to the application structure 106 via bolts 108 passed through bolt holes 110. The load sensing bearing assembly 100n can include a ring of elastomeric material 172 fitted into an annular space between the bearing cup 102 and the application structure 106 for sealing purposes. The anisotropic spring regions 112 permit limited displacement and rotation of the bearing cup 102 relative to the application structure 106. The anisotropic spring regions 112 within the load sensing bearing assembly 100n are each defined by a set of slots 182 equidistantly spaced through the annular member 180, at a common diameter from the Y-axis of the load sensing bearing assembly 100n, radially disposed between the bearing cup 102 and the bolt holes 110.

To measure the forces and moments acting on the bearing assembly 100n, a set of sensor modules 116, comprising a plurality of displacement sensor modules 138 and/or a plurality of strain sensor modules 140 is disposed within the anisotropic spring regions 112. Each displacement sensor module 138 is positioned across the radial centerline of each slot 182 on a front face 184 of the annular member 180. On the back face 186 of the annular member 180, a strain sensor module 140 is disposed on each side of the bolt holes 110, approximately aligned with each end of the adjacent slots 182, and on a common circumference with the bolt holes 110, as best seen in FIG. 15C with reference to FIG. 15A. This alternate arrangement and type of anisotropic spring regions 112, coupled with the set of sensor modules 116 provides a set of sensor signals that can be used to calculate the values of the three forces, Fx, Fy, and Fz, and two moments, Mx and Mz, acting on the bearing cup 102.

It is appreciated that while FIG. 1A through FIG. 15C illustrate various embodiments of the load sensing bearing assembly 100 with cyclic symmetry every 90 degrees in the circumferential direction about the Y-axis (i.e., four cycles around the circumference), other cyclic symmetries are possible, such as, but not limited to, 120 degrees (i.e., three cycles around the circumference), 60 degrees (i.e., six cycles around the circumference), and 45 degrees (i.e., eight cycles around the circumference). Additionally, it is also understood that while the bearing cup 102 and flange assembly 104 in the various exemplary embodiments shown herein are parts generally separate from the application structure 106 upon which the load sensing bearing assembly 100 is mounted, the bearing cup 102, anisotropic spring regions 112, 152 and the flange assembly 104 may be integrally formed with the application structure 106 within the scope of the present invention.

Those of ordinary skill in the art will understand that each individual sensor module 116 within, a set of sensors modules for the various illustrated embodiments may contain either a single sensor unit or a multitude of sensors units to detect various types of information, including without limitation: strain, displacement, rotation, or temperature, as necessary to provide sufficient information to determineat least one of the forces Fx, Fy, Fz and moment forces Mx and Mz acting on the load sensing bearing assembly 100. In all embodiments, the sensor units included within the set of sensors modules may optionally be used to monitor vibration and temperature for condition monitoring. Optionally, one or more temperature sensor units may be included within the set of sensor modules 116, preferably in close proximity to a strain, displacement, or other sensor units, to provide temperature information to compensate for thermal effects on the strain, displacement, or other sensors units.

Those of ordinary skill in the art will recognize that any strain, displacement, rotation, or temperature sensor technology can be utilized within the scope of the present invention to acquire necessary measurements. For example, strain sensors such as, but not limited to, resistive, optical sensors, capacitive sensors, inductive sensors, piezoresistive, magnetostrictive, MEMS, vibrating wire, piezoelectric, and acoustic sensors are suitable and may be used within the scope of the invention. Similarly, quarter-bridge, half-bridge, or full bridge sensors units, which are well known in the art, may be used.

The specific locations of the sensor modules illustrated in the various embodiments of the present invention may be adjusted to some extent. Due to the adjustable nature of the signal processing software used to translate the sensor signals into the three forces, two moments, optional temperature signals and/or optional speed signals, minor adjustments or misalignments in the placement of sensor modules can be compensated for by adjusting parameters within the analyzing software.

In each of the above-described embodiments, an X-axis, a Y-axis, and a Z-axis have been identified in relation to the longitudinal axis of the load-sensing bearing assembly 100. These axes are for the description of the load-sensing bearing assembly embodiments and do not dictate or require any specific orientation of the present invention. That is to say, for example, the axial centerline of the load-sensing bearing 100 may be in any direction as long as the general relationship between the anisotropic spring regions, sensor modules, flange assembly, and bearing cup are maintained as described within each of the above embodiments.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A load sensing bearing assembly for attachment to an application structure, comprising;
   a bearing outer race;
   a support structure configured to secure the bearing outer race to the application structure, said support structure including at least one anisotropic spring region configured to enable a limited range of movement between the bearing outer race and the application structure;
   a set of sensor modules disposed on said support structure, said set of sensor modules configured to produce a set of signals responsive to forces and moments applied to said bearing outer race.

2. The load sensing bearing assembly of claim 1 wherein said set of sensor modules is configured to produce a set of signals responsive to radial forces applied to said bearing outer race.

3. The load sensing bearing assembly of claim 1 wherein said set of sensor modules is configured to produce a set of signals responsive to thrust forces applied to said bearing outer race.

4. The load sensing bearing assembly of claim 1 wherein said set of sensor modules is configured to produce a set of signals responsive to tilting moments applied to said bearing outer race.

5. The load sensing bearing assembly of claim 1 wherein said set of sensor modules includes at least one sensor module selected from set including a displacement sensor, a strain sensor, and a rotation sensor.

6. The load sensing bearing assembly of claim 5 wherein said set of sensor modules further includes at least one sensor module selected from set including a temperature sensor, a speed sensor, an accelerometer, and a vibration sensor.

7. The load sensing bearing assembly of claim 1 wherein said set of sensor modules includes at least one sensor modules selected from a set including a mechanical sensor, an optical sensor, an electro-optical sensor, a fiber-optic sensor, a capacitive sensor, an inductive sensor, a resistive sensor, a piezoresistive sensor, a MicroElectroMechanical System (MEMS) sensor, a vibrating wire sensor, an ultrasonic sensor, magnetic sensor, magnetostrictive sensor, resonating sensor, tunneling sensor, atomic force sensor, or a semiconductor sensor.

8. The load sensing bearing assembly of claim 1 wherein said set of sensor modules includes at least one sensor module selected from a set including a quarter-bridge sensor, a half-bridge, or a full-bridge sensor.

9. The load sensing bearing assembly of claim 1 wherein at least one sensor module in said set of sensor modules is disposed within said support structure.

10. The load sensing bearing assembly of claim 1 wherein at least one sensor module in said set of sensor modules is disposed on an external surface of said support structure.

11. The load sensing bearing assembly of claim 1 wherein at least one sensor module in said set of sensor modules is disposed across a gap in said support structure.

12. The load sensing bearing assembly of claim 1 wherein said support structure is integrally formed with the application structure.

13. The load sensing bearing assembly of claim 1 wherein said bearing cup is integrally formed with said support structure.

14. The load sensing bearing assembly of claim 1 wherein said support structure further includes a plurality of anisotropic spring regions equidistantly spaced around a longitudinal axis of the bearing outer race.

15. The load sensing bearing assembly of claim 1 wherein said at least one anisotropic spring region is configured to enable a limited range of radial displacement between the bearing outer race and the application structure.

16. The load sensing bearing assembly of claim 1 wherein said at least one anisotropic spring region is configured to enable a limited range of axial displacement between the bearing outer race and the application structure.

17. The load sensing bearing assembly of claim 1 wherein said at least one anisotropic spring region is configured to enable a limited range of rotation between the bearing outer race and the application structure.

18. A load sensing bearing assembly for attachment to an application structure, comprising;
   a bearing outer race;
   a flange assembly configured to secure the bearing outer race to the application structure, said flange assembly including an inner annular flange and an outer annular flange, said inner annular flange and said outer annular flange separated by an gap;
   at least one anisotropic spring region coupling said inner annular flange to said outer annular flange across said gap, said at least one anisotropic spring region configured to enable a limited range of movement between the bearing outer race and the application structure;
   a set of sensor modules disposed on said flange assembly, said set of sensor modules configured to produce a set of signals responsive to forces and moments applied to said bearing outer race.

19. The load sensing bearing assembly of claim 18 wherein at least one sensor module is disposed across said gap.

20. The load sensing bearing assembly of claim 18 wherein said at least one anisotropic spring region includes:
   an axial beam;
   an inner cross beam coupling said inner annular flange to a first longitudinal end of said axial beam;
   an outer cross beam coupling said outer annular flange to a second longitudinal end of said axial beam opposite from said first end;
   wherein said axial beam, said inner cross beam, and said inner annular flange define an inner channel;
   wherein said axial beam, said outer cross beam, and said outer annular flange define an outer channel.

21. The load sensing bearing assembly of claim 20 wherein at least one sensor module is dispose on surface of said inner cross beam aligned substantially with a radial centerline of said inner cross beam.

22. The load sensing bearing assembly of claim 20 wherein at least one sensor module is disposed across said outer channel aligned substantially with a radial centerline of said outer channel.

23. The load sensing bearing assembly of claim 18 wherein said at least one anisotropic spring region includes:
   an connecting element;
   a pair of inner radial spokes coupling opposite ends of said connecting element to said inner annular flange;
   a outer radial spoke coupling said connecting element to said outer annular flange, said outer radial spoke aligned with a radial centerline of said connecting element; and
   wherein said pair of inner radial spokes, said connecting element, and said inner annular flange define an enclosed channel.

24. The load sensing bearing assembly of claim 23 wherein said at least one sensor module is a displacement sensor disposed across said enclosed channel on a radial centerline between said connecting element and said inner annular flange.

25. The load sensing bearing assembly of claim 23 wherein said set of sensor modules includes at least a pair of strain sensor modules disposed on a surface of said connecting element between each of said inner radial spokes and said outer radial spoke.

26. The load sensing bearing assembly of claim 23 wherein said set of sensor modules includes at least one speed sensor module operatively coupled to said bearing outer race.

27. The load sensing bearing assembly of claim 18 wherein said at least one anisotropic spring region includes a radial spoke coupling said inner annular flange to said outer annular flange, said radial spoke including a first channel across the width of a first face of said radial spoke, said first channel adjacent said inner annular flange, and a second channel across the width of a second face of said radial spoke opposite from said first face, said second channel disposed radially outward from said first channel.

28. The load sensing bearing assembly of claim 23 wherein said set of sensor modules includes at least one speed sensor module operatively coupled to said bearing outer race.

29. A load sensing bearing assembly for attachment to an application structure, comprising;
   a bearing outer race;
   a support structure configured to secure the bearing outer race to the application structure, said support structure including an annular anisotropic spring region including a plurality of slots parallel to a longitudinal axis of said bearing outer race, said slots configured to enable a limited range of movement between the bearing outer race and the application structure; and
   a set of sensor modules disposed within said slots, said set of sensor modules configured to produce a set of signals responsive to forces and moments applied to said bearing outer race.

30. The load sensing bearing assembly of claim 29 further including an elastomeric fill material within said slots.

31. A load sensing bearing assembly for attachment to an application structure, comprising;
   a bearing outer race;
   a plurality of flange protrusions equidistantly spaced about a circumference of said bearing outer race and configured to secure the bearing outer race to the application structure, said flange protrusions each including a slot aligned with a radial centerline of the flange protrusion to enable a limited range of movement between the bearing outer race and the application structure; and
   a set of sensor modules disposed within said slots, said set of sensor modules configured to produce a set of signals responsive to forces and moments applied to said bearing outer race.

32. A load sensing bearing assembly for attachment to an application structure, comprising;
   a bearing outer race;
   a rectangular support structure configured to secure the bearing outer race within an oversize opening in the application structure, said rectangular support structure including offset sides; and
   a set of sensor modules coupled between each of said offset sides and said application structure, said set of sensor modules configured to produce a set of signals responsive to forces and moments applied to said bearing outer race.

33. The load sensing bearing assembly of claim 32 wherein an elastomeric material is disposed within said oversize opening between the application structure and said bearing outer race.

34. A load sensing bearing assembly for attachment to an application structure, comprising;
   a bearing outer race;
   a plurality of mounting posts equidistantly spaced about a circumference of said bearing outer race and configured to secure the bearing outer race to the application structure, said mounting posts each including an axially raised surface for contact with the application structure to enable a limited range of movement between the bearing outer race and the application structure; and
   a set of sensor modules disposed on side surfaces of at least one of said plurality of mounting posts, said set of sensor modules configured to produce a set of signals responsive to forces and moments applied to said bearing outer race.

35. A load sensing bearing assembly for attachment to an application structure, comprising;
   a bearing outer race;
   an annular support structure configured to secure the bearing outer race to the application structure, said support structure including a plurality of slots defining least one anisotropic spring region configured to enable a limited range of movement between the bearing outer race and the application structure;

a set of sensor modules disposed on said annular support structure, said set of sensor modules configured to produce a set of signals responsive to forces and moments applied to said bearing outer race.

36. The load sensing bearing assembly of claim 35 wherein said set of sensor modules includes a set of displacement sensor modules and a set of strain sensor modules;

each of said displacement sensor modules disposed across a radial centerline of one of said plurality of slots; and each of said strain sensor modules disposed adjacent an attachment point between said annular support structure and said application structure.

* * * * *